(12) United States Patent
Weitkamp

(10) Patent No.: US 7,603,202 B2
(45) Date of Patent: Oct. 13, 2009

(54) METHOD FOR OPTIMIZING THE OPERATION OF WIND FARMS

(75) Inventor: Roland Weitkamp, Belm (DE)

(73) Assignee: REpower Systems AG, Hamburg (DE)

( * ) Notice: Subject to any disclaimer, the term of this patent is extended or adjusted under 35 U.S.C. 154(b) by 104 days.

(21) Appl. No.: 11/667,707

(22) PCT Filed: Nov. 22, 2005

(86) PCT No.: PCT/EP2005/012489

§ 371 (c)(1),
(2), (4) Date: May 14, 2007

(87) PCT Pub. No.: WO2006/056404

PCT Pub. Date: Jun. 1, 2006

(65) Prior Publication Data

US 2007/0299548 A1 Dec. 27, 2007

(30) Foreign Application Priority Data

Nov. 22, 2004 (DE) .................. 10 2004 056 254

(51) Int. Cl.
*F03D 9/00* (2006.01)
(52) U.S. Cl. .............. 700/287; 290/44; 290/55
(58) Field of Classification Search ............ 700/19, 700/22, 28, 29, 52, 286, 287, 295; 290/44, 290/55; 702/3, 81–85, 104, 182–184
See application file for complete search history.

(56) References Cited

U.S. PATENT DOCUMENTS 4,683,718 A    8/1987    Larsson

2003/0102675 A1*  6/2003  Noethlichs ............ 290/44
2004/0119292 A1*  6/2004  Datta et al. ............ 290/44
2007/0047163 A1*  3/2007  Lutze et al. ............ 361/78

FOREIGN PATENT DOCUMENTS

DE    101 27 451 A1    12/2002
DE    10137272         2/2003

OTHER PUBLICATIONS

International Preliminary Report on Patentability and Written Opinion dated Aug. 2, 2007, directed to counterpart application No. PCT/EP2005/012489 (7 pages).

* cited by examiner

*Primary Examiner*—Charles R Kasenge
(74) *Attorney, Agent, or Firm*—Morrison & Foerster LLP

(57) ABSTRACT

A method for optimizing the operation of wind energy installations includes operating target and reference wind energy installations to optimize the target installation first using a first set of operating parameters and then using a second set of operating parameters different from the first operating parameters, recording target variables for the target wind energy installation and recording reference results of the reference wind energy installation in each case for both sets of operating parameters, performing an automated evaluation of the target variables by calculation of a quality measure taking account of the reference results, and determining in an automated manner based on the automated evaluation which of the sets of operating parameters has better quality measure. Each wind installation includes comprise a rotor, a generator driven by the rotor to produce electrical energy, and a controller operating the wind energy installation on the basis of a set of operating parameters.

20 Claims, 7 Drawing Sheets

METHOD FOR OPTIMIZING THE OPERATION OF WIND FARMS

REFERENCE TO RELATED APPLICATIONS

This application is a national stage application under 35 USC 371 of International Application No. PCT/EP2005/012489, filed Nov. 22, 2005, which claims the priority of German Application No. 10 2004 056 254.7, filed Nov. 22, 2004, the contents of both of which prior applications are incorporated herein by reference.

FIELD OF THE INVENTION

The invention relates to a method for optimization of the operation of wind energy installations which comprise a rotor, a generator driven by the rotor in order to produce electrical energy, and a controller, with the controller operating the wind energy installation on the basis of a set of operating parameters, and a second wind energy installation is used as the reference wind energy installation.

The production of electrical energy from wind power is becoming increasingly financially important. Measures are therefore being searched for in order to increase the yield. In addition to the choice of a suitable location for the wind energy installation and the selection of a type which is suitable for that location, this also includes the choice of the correct operating parameters. This is of particularly major importance for modern energy installations, since these are complex structures which are operated with the aid of a complex control system. This offers a multiplicity of variable parameters, which must be set optimally in order to achieve a result which is as good as possible. A good operating result in this case does not, however, mean just the production of as much electrical energy as possible, but also relates to other aspects, such as noise emission that is as low as possible, low loads on the drive train and on the entire structure of the wind energy installation, or else aspects relating to good grid-system compatibility. In order to set the parameters for operation of the wind energy installation as well as possible, optimization methods are used in order to improve values obtained from practical experience.

DE-A-101 27 451 discloses parameter variation being carried out in order to find an optimum value. The method is based on the idea of variation of one parameter by means of a timer within predeterminable limit values until an optimum value is found. One disadvantage of this method is that only a local optimum, instead of a global optimum, is frequently determined in this way. Furthermore, the method has the disadvantage that it cannot distinguish between stochastic fluctuations resulting from changes in the environmental parameters, in particular in the wind strength and direction, and real improvements resulting from a changed parameter setting. The method therefore does not always provide satisfactory results. Furthermore, the process is relatively slow.

SUMMARY OF THE INVENTION

The invention is based on the object of improving a method of the type mentioned initially so as to allow optimization to be carried out more quickly and more reliably.

The solution according to the invention is contained in the features of the invention as disclosed broadly herein. Advantageous developments are the subject matter of the specific embodiments disclosed below.

In the case of a method for optimization of the operation of wind energy installations which comprise a rotor, a generator driven by the rotor in order to produce electrical energy, and a controller, with the controller operating the wind energy installation on the basis of a set of operating parameters, and a second wind energy installation is used as the reference wind energy installation, the invention provides for a target wind energy installation which is to be optimized first of all to be operated with a first set of parameters and then with a different, second set of parameters, target variables for the target wind energy installation and reference results from the reference wind energy installation in each case to be recorded for both sets of operating parameters, the target variables to be evaluated automatically by calculation of a quality measure taking account of the reference results, and the set of parameters to be determined automatically using the better quality measure.

The invention is based on the idea of not just restricting the optimization process for the operating result to the wind energy installation (target wind energy installation) to be optimized, but to assess the result of changes to the operating parameters automatically on the basis of a reference installation. This reference installation is preferably arranged in the same physical vicinity and is, for example, an adjacent installation; however, this physical proximity is not absolutely essential. The choice of the reference wind energy installation is in fact based on the prevailing conditions being as comparable as possible overall, although the relationships need not be identical. The wind conditions and the incident flow conditions that they result in at the rotor of the wind energy installations are of major importance in this case. As is known, generally the wind does not blow uniformly, but fluctuates. These fluctuations generally are stochastic, and relate to all of the wind parameters, for example the wind speed, direction, gust factor, turbulence conditions, etc. These fluctuations of the wind make it more difficult to compare successive measurements, to be precise, with this even being impossible in some cases. Traditionally, this inescapable stochastic nature of the wind has been countered by using long measurement times in order in this way to achieve an average. Optimization can be carried out only slowly in this way.

This is the purpose of the invention. The invention provides for the stochastic nature of the wind not to be attacked as being undesirable, as in the past, with long measurement times being accepted for this purpose, and instead, according to the invention, the stochastic nature is accepted and is used to speed up the optimization process. The invention achieves this in that it successively operates the target wind energy installation with two mutually different sets of operating parameters, and records the operating result obtained in the process, or expressed in more general words, target variables. This is also done with respect to the reference wind energy installations although in the case of these installations, there is no need to change the operating parameters. It is sufficient to record their reference result in parallel with those of the target wind energy installations.

The invention makes use of the discovery that the target installation and reference installation are affected in a similar manner by random changes, such as a fluctuation in the wind speed or wind direction changes. Power changes caused in this way therefore relate to the target wind energy installation and the reference wind energy installation in the same way and are therefore ignored. Changes in the operating result which are based on a change in the operating parameters in contrast have different effects on the target wind energy installation and the reference wind energy installation. The invention has discovered that the fluctuations in the operating results of the reference installations can be used to obtain a measure in a simple manner for the stochastic nature of the wind, and that the quality measure can thus be validated in this way. This makes it possible to decide quickly and automatically whether changes (for example increase) is actually a result of the changed set of operating parameters or whether it is just due to the stochastic nature of the wind. In the first-mentioned case, the result can be used for optimization, while in the second-mentioned case it is rejected. The invention therefore makes it possible to obtain a statement about the effect of changes in the operating parameters on the achieved target variables (in particular operating results) in an automated form and without long measurement times. It therefore combines the advantages of a long-lasting averaging process, in terms of the capability to distinguish between real changes resulting from parameter changes and changes that are not real because of the stochastic nature of the wind, on the one hand, with those of a rapid optimization process, ignoring the stochastic nature, for the optimization rate, on the other hand. The target wind energy installation can be operated using the set of operating parameters that have been optimized in this way. Since the method according to the invention is not very susceptible to random changes, the time duration for carrying out the optimization process can be shortened. The method according to the invention can be quickly carried out, and quickly leads to an optimum operating result even in the case of large windparks with a large number of wind energy installations.

The capability of carrying out the process quickly is, in particular, as a result of automation. This allows the method to be carried out not only quickly but also frequently. If the optimization process according to the invention is carried out frequently, this offers a guarantee that the wind energy installations that have been optimized in this way will be operating at their optimum value for virtually the whole of the time. This is advantageous in particular in those situations in which high stochastic fluctuations occur in the wind conditions. The invention provides a relatively simple method, which can be carried out frequently, even in conditions such as these, thanks to its automation.

Some of the terms used are explained below:

The expression operating parameter means a coefficient or parameter of the system that influences the system behavior. In this case, it may be a coefficient or parameter of the mechanical or electrical system, or a coefficient or parameter of the open-loop and closed-loop control facility.

The target variable to be optimized is a system variable. This is obtained as a consequence of other variables and parameters. The expression therefore also covers the operating result of the wind energy installation, together with the electrical energy or power output. Further examples of the target variable to be optimized are the noise emission from the wind energy installation, grid-system compatibility of the electrical energy that is produced, the installation load in particular resulting from bending and/or vibration loads, and the oscillation response. The expression "reference result" has a meaning corresponding to that of the expression "operating result". There is no need for the "operating result" and the "reference result" to always be identical parameters.

The electrical power output from the target wind energy installation is expediently used as the target variable to be optimized, and the energy yield as determined over a time period which can be selected is used as the quality measure. The optimization process can in this way be based on the power and energy as the parameters which are particularly important for economic operation of the wind energy installation. The blade angle of the rotor blades, the rotation-speed torque characteristic of the generator and/or the offset of a wind direction sensor are/is preferably used as the operating parameter or parameters to be varied. The blade angle is the pitch angle of the individual rotor blades with respect to the rotor plane, with the aim also being optimization of the individual blade angles of the rotor blades, of which there are in general three. The optimum rotation speed of the rotor is determined by means of the rotation-speed torque characteristic in the partial-load range, on the basis of the tip-speed ratio. The wind direction sensor offset is a value for the sensor offset from its nominal direction. This is a result of the fact that the wind direction sensor can be calibrated only with a finite accuracy, and that an inaccuracy must be expected in practice, and may amount to several degrees. In addition, the wind sensor is located in an area which is affected by vortices caused by the rotor. Measurement errors therefore occur. If the wind energy installation is aligned by means of a slaving device based on signals from the wind direction sensor, then the error caused by the offset increases. The method according to the invention advantageously can be used to minimize this error and to optimize the operation of the wind energy installation.

According to one preferred embodiment, the operating parameters of the reference installation are not changed. This has the advantage that there is no need for active access to the reference wind energy installation. Furthermore, this ensures that changes in the target variable caused by wind fluctuations are not confused with the changes caused by variation of the operating parameters. This makes it possible to also use "remote" wind energy installations, which are not part of this particular windpark, as reference wind energy installations. Furthermore, this also makes it possible to simultaneously access the reference wind energy installation with a plurality of target wind energy installations to be optimized without the possibility of conflicts resulting from different parameter variations.

The validation process preferably comprises a check of an evaluation matrix which contains a plurality of other wind energy installations which are provided as reference wind energy installations. An evaluation matrix such as this is particularly advantageous for optimization of a relatively large number of wind energy installations, for example when optimizing entire windparks. The evaluation matrix contains information about the relationship between the target wind energy installation and the reference wind energy installation. This makes it possible to convert changes in the target variables in the reference wind energy installation to changes in the target variable of the target wind energy installation, for example, by taking into account different power curves from the target wind energy installation and from the reference wind energy installation. Furthermore, the information that is stored can be used to define a validation threshold up to which the data of the reference wind energy installation is accepted, and beyond which it is rejected. It is therefore possible to provide for a sharper scale to be used for validation for identical wind energy installations in physically close proximity than in the case of a reference wind energy installation which is only similar and is also located a certain distance away. However, a further validation measure must be compensated for by a longer measurement time period and/or by the evaluation of a plurality of measurement time periods, that is to say by statistical approaches, in order to achieve results of the same quality. These relationships can be expressed in a summarized form by a scalar coupling value in a simple evaluation matrix—however, the evaluation matrix is preferably formed such that it has vectors as elements. These contain values for various intrinsic and extrinsic conditions which must be taken into account in the logical linking of a reference wind energy installation to a specific target wind energy installation. This results in additional options for refined evaluation. Furthermore, this simplifies the representation and mathematical evaluation. An evaluation matrix such as this is therefore particularly suitable for automation.

Both static and dynamic conditions are expediently taken into account when carrying out the validation of the reference wind energy installation. The static conditions include, in particular, the abovementioned intrinsic conditions, but also a number of other conditions, such as the installation location and its environmental conditions. The dynamic conditions include, in particular, those which relate to the prevailing weather conditions. This relates in particular to the wind parameters (wind strength and wind direction). By way of example, the wind direction is used to exclude wind energy installations which are located in front of or behind the target installation to be optimized, in the wind direction. Otherwise there would be a risk of the reference installation being influenced by interactions with the target wind energy installation to be optimized. Interactions such as these occur in particular upstream and downstream along the respective wind direction. This can result in a situation in which, in the case of wind energy installations positioned in a row, the method according to the invention can be used for most wind directions, but not when the wind is blowing along the direction defined by the row. In a situation such as this, the method according to the invention would preferably suppress the optimization process until the wind was blowing from a better direction. This avoids corruptions.

Intrinsic conditions are expediently used for the definition of the reference wind energy installations. The expression intrinsic conditions should be understood to mean those characteristics which are related to the wind energy installation itself. These include, for example, the machine type of the generator, the control concept that is used for the wind energy installation, the rotor design (fixed rotation speed or variable rotation speed), the rotor blade type and the installation size. However, there is no need to use only a wind energy installation that is identical in this respect as the reference wind energy installation. It is generally sufficient to define a similar installation as the reference wind energy installation.

Furthermore, it is expedient to use extrinsic conditions for the definition of the reference wind energy installation. In particular, these include those factors which describe the interaction between the wind energy installation and the environment. These include, inter alia, the installation location and elevation as well as the position with respect to obstructions which influence the incident wind flow for the respective wind energy installation. In this context, obstructions which will be considered are not only natural obstacles, such as hills or woods, but also artificial structures including wind energy installations installed in the vicinity, since they also affect the flow conditions, depending on the wind direction.

The variation of operating parameters and recording of the target variables are preferably continued until a predeterminable termination criterion $\epsilon$ is reached. In this case, $\epsilon$ expediently represents a magnitude difference in the quality measure. If this magnitude is below a variable threshold, then the optimization process can be ended for this reference wind energy installation. It is self-evident that it is not absolutely essential here to use complex quality measures for the termination criterion. It is also possible to provide a simple quality measure. One possibility, for example, is 10 minute mean values.

Provision is preferably made for the use of a correction matrix K. The correction matrix contains correction values for the individual combinations of target and reference wind energy installations. This makes it possible to take account of differences between the various wind energy installations in the calculation process. The correction matrix is preferably formed adaptively. This means that the individual values in the correction matrix are automatically adapted by means of a self-learning algorithm. This means that changes which can occur over relatively long operation of the individual wind energy installations are taken into account automatically.

On the basis of the above explanation, there is no need for any further explanation relating to the fact that a suitable reference installation cannot be defined in a predictable manner just—but not only—because of the fluctuating nature of the wind, but can always be carried out successfully only on the basis of the respectively prevailing environmental conditions in each case. In principle, this decision can be made by the operating personnel. However, in order to avoid the operator and his personnel having to make this decision, a further aspect of the invention, for which independent protection may be sought, provides for this decision to be made automatically.

In one preferred embodiment, a plurality of wind energy installations are defined to form a group of target wind energy installations and/or reference wind energy installations. For example, in the case of a row of a plurality of wind energy installations, positioned transversely with respect to the wind direction, every alternate installation may be a target wind energy installation for which the varied set of operating parameters is used. This does not just have the advantage that a plurality of target wind energy installations can be optimized at the same time. A further considerable advantage is that, because of the large number of wind energy installations, a short observation time is actually sufficient to record and to evaluate significant operating results. It has been found that, in good conditions, for example, in the case of a row of a total of ten to twenty offshore wind energy installations located transversely with respect to the wind direction, even ten minutes of operation may be sufficient to assess the effects of the variation of operating parameters on the target variable to be optimized. In this case, the invention makes use of the discovery that a comparable valid result can be obtained just by using samples taken in parallel at one time rather than a number of samples taken over a relatively long time period. This considerably speeds up the implementation of the optimization process according to the invention.

Group formation furthermore offers the capability to use more complex optimization methods, in which a plurality of sets of parameters are assessed at the same time. One such option, for example, is to vary the operating parameter sets for the group of target wind energy installations so as to form a gradient field for the parameter to be optimized. It is then possible to use a gradient method, which is known per se, to quickly determine the value with which the optimization process should best be continued. In consequence, the optimization process converges very quickly, so that an optimum set of operating parameters can be found at an early stage. The greater the number of wind energy installations in the group, the more quickly the optimization process can be carried out. The invention therefore offers the capability to optimize even large windparks quickly.

There is no need to ensure a 1:1 relationship between reference wind energy installations and target wind energy installations. It is possible to provide for a plurality of target wind energy installations to be used. This has the advantage that discrepancies between the wind energy installations can be identified, and any spurious results can be eliminated in this way. This overcomes the risk of a defective wind energy installation, or a wind energy installation which has been interfered with in some other manner, leading to corrupted results of the optimization process.

The invention also relates to a wind energy installation having a rotor, to a generator driven by the rotor in order to produce electrical energy, and to a controller which is designed to operate the wind energy installation on the basis of a set of operating parameters, with the controller being connected to a recording device for operating variables and target variables for a reference wind energy installation, and the controller having an optimization module for carrying out the method according to the invention.

The invention also relates to a windpark having a plurality of wind energy installations which comprise a rotor, a generator driven by the rotor in order to produce electrical energy, and a controller, which controller is designed for operation of the wind energy installations on the basis of a set of operating parameters, and a parkmaster with a control function is provided for the wind energy installations, in which case, according to the invention, the parkmaster has an optimization module for carrying out the method according to the invention. In this case, the parkmaster does not need to be a physically separate facility, it may also be in the form of an element of the controller for a wind energy installation.

For explanatory purposes, reference is made to the above description of the method according to the invention.

BRIEF DESCRIPTION OF THE DRAWINGS

The invention will be explained in the following text with reference to the attached drawing, in which advantageous exemplary embodiments of the invention are illustrated and in which.

DETAILED DESCRIPTION OF THE INVENTION

Figure 1:
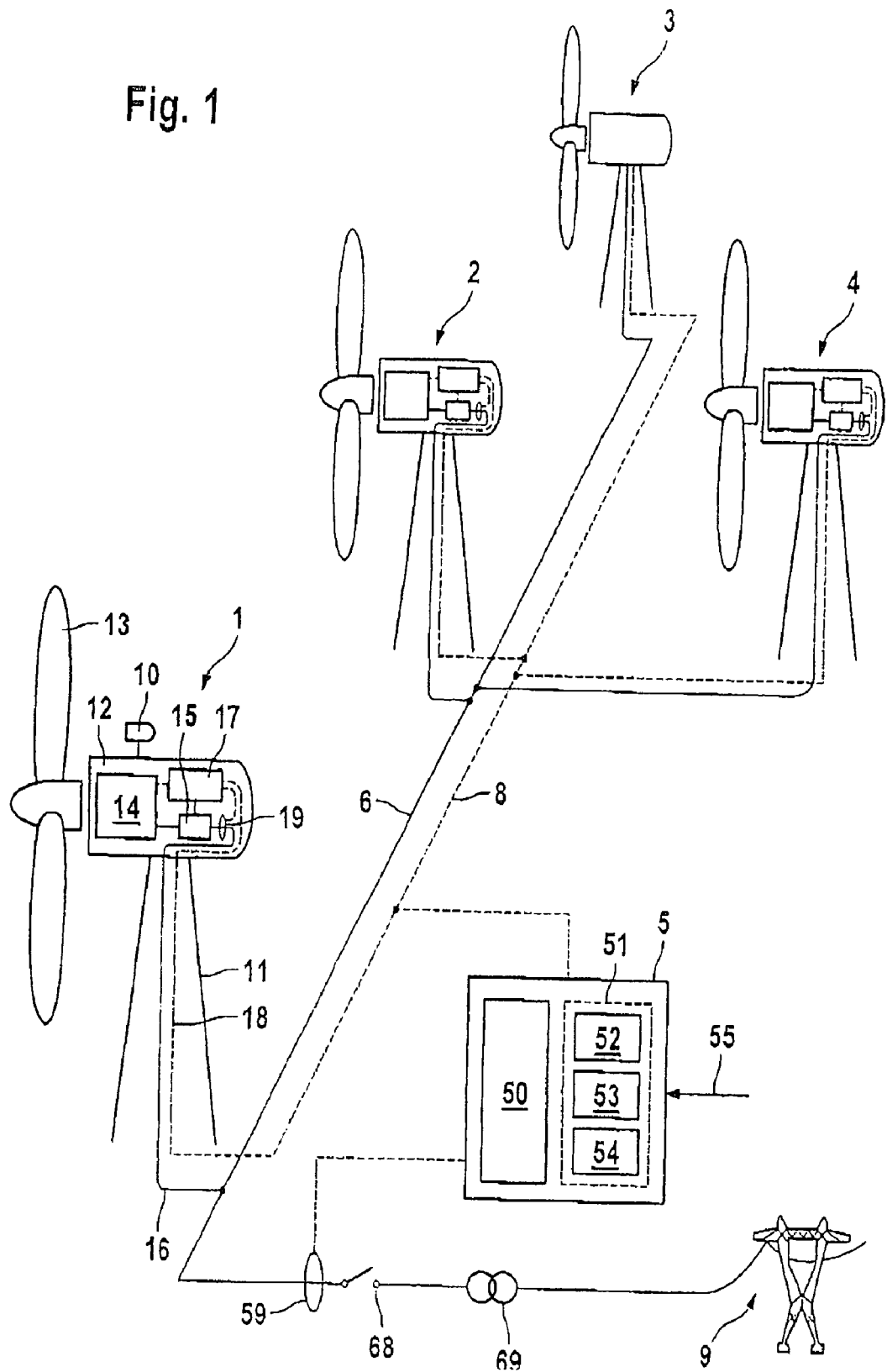
FIG. 1 shows an overview illustration of a windpark for use of the method according to the invention.

A windpark which is intended to carry out the method according to the invention is illustrated in FIG. 1, and comprises a plurality of wind energy installations 1 to 4 as well as a parkmaster 5.

The wind energy installations 1 to 4 are designed to be identical. The wind energy installation 1 will be used to explain the design; a corresponding explanation applies to the others. The wind energy installation 1 comprises a tower 11 with a machine house 12 arranged on it such that it can swivel. A rotor 13 is mounted at its one end such that it can rotate, and is connected via a driveshaft (not illustrated) to a generator 14. The generator 14 is preferably a double-fed asynchronous machine, although other types such as synchronous machines or asynchronous machines may also be used. The generator 14 is connected to a connecting line 16 via a converter 15. The converter 15 may be in the form of a full converter or a partial converter. A windvane 10 is provided as a sensor for the controller 17, in order to determine the wind direction.

A controller 17 is provided in order to control the operation of the wind energy installation 1, and is designed to operate the wind energy installation 1 in accordance with variable presets. The presets may be defined internally or may be supplied via a data connection 18 from the outside. The control device 17 is connected to measurement devices, of which a power measurement device 19 is illustrated by way of example. This is used to determine the electrical voltage, the current and the phase angle emitted from the wind energy installation, from which, inter alia, the electrical energy output can be determined. The wind energy installation 1 is operated in this way and by means of the presets transmitted via the data connection 18. The controller 17 for this purpose has appropriate control devices with a multiplicity of operating parameters.

The respective connecting lines 16 of the wind energy installations 1 to 4 are connected to a busbar system 6 in the windpark. The electrical energy output from the individual wind energy installations 1 to 4 in the windpark is fed into the busbar system 6. The busbar system 6 is connected via a linking point 69 to a high-voltage grid system 9 of a power supply company. A transformer for increasing the voltage level as well as a switching device 68 for disconnection of the windpark from the high-voltage grid system 9 may be provided at the linking point 69.

The data lines 18 from the wind energy installations 1 to 4 are combined to form a data network 8 for the windpark. This is connected to a parkmaster 5 which provides central operational control for all of the wind energy installations 1 to 4 in the windpark. Furthermore, it uses a measurement device 59 to monitor the connection of the windpark to the high-voltage grid system 9. External presets, such as those from the operator of the high-voltage grid system 9 or from the windpark operator, are applied to the parkmaster 5 via a connection 55. The parkmaster 5 uses a host computer 50 to determine nominal variables for the operation of the individual wind energy installations 1 to 4, based on the operating conditions and the presets. These are transmitted via the data network 8 to the control devices 17 for the individual wind energy installations 1 to 4. Furthermore, the parkmaster 5 is provided with an optimization module 51, which comprises a determination element 52, an optimization element 53 and a validation element 54. The way in which the optimization module operates will be explained in more detail later, together with its functional elements.

Figure 2:
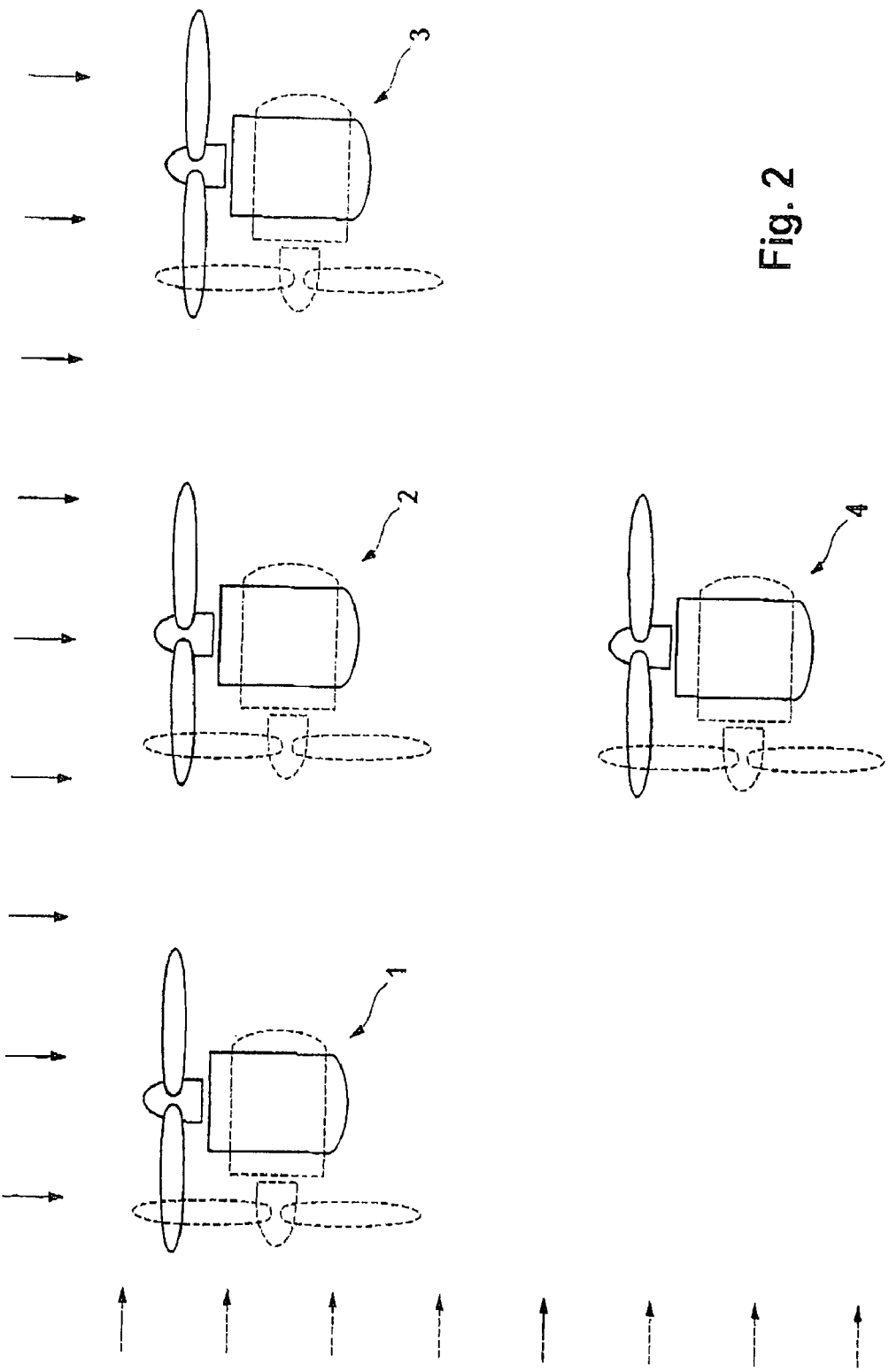
FIG. 2 shows a schematic illustration of the windpark for carrying out the method according to the invention.

First of all, one exemplary embodiment will be explained with reference to FIG. 2. FIG. 2 shows a schematic view from above of the windpark as illustrated in FIG. 1. This shows the wind energy installations 1, 2 and 3, which are arranged in a row, as well as the wind energy installation 4 which is arranged in a second row individually, behind the first. The parkmaster 5 as well as the busbar system 6 and the data network 8 are not shown in FIG. 2. For explanatory purposes, it is further assumed that the windpark is being operated with a wind as symbolized by the solid arrows. The wind energy installations 1 to 4 are then aligned as represented by solid lines.

Figure 8:
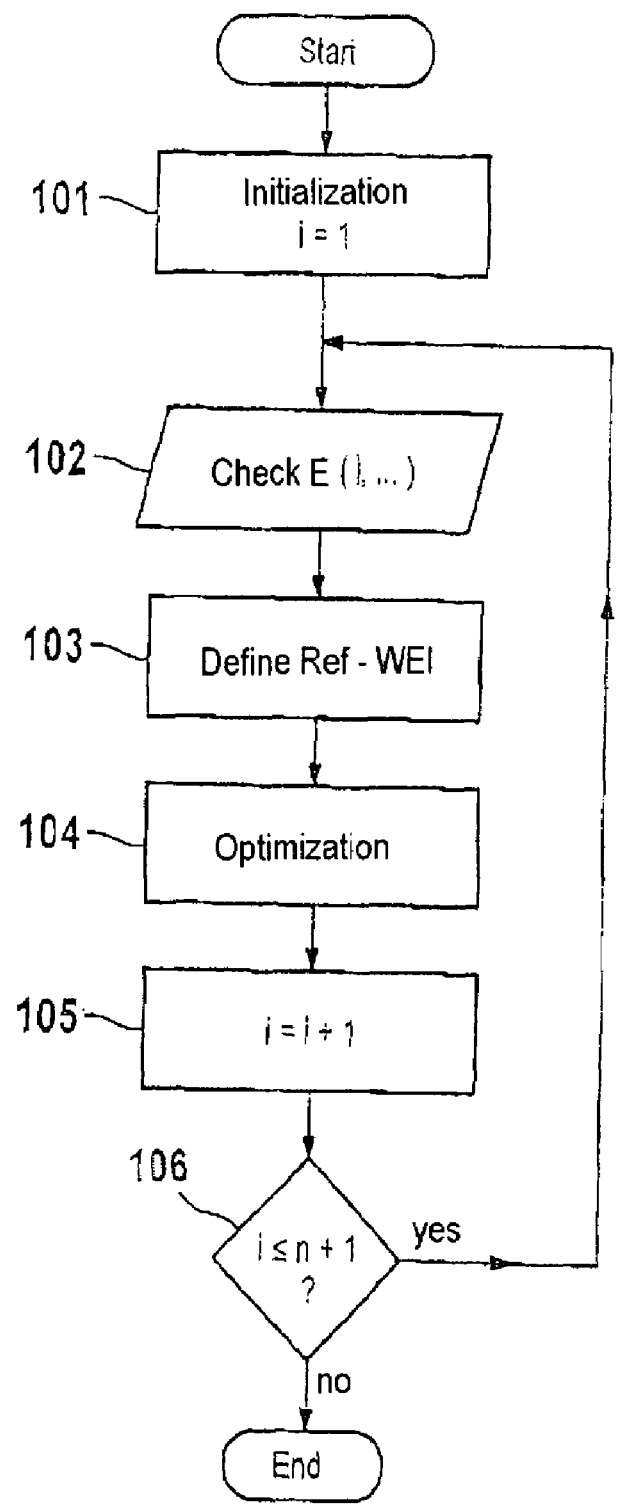
FIG. 8 shows a flowchart for an outline method for the optimization process according to the invention.

For explanatory purposes, the optimization process according to the invention will now be considered as embodied by the optimization module 51. Reference is also made to FIG. 8. First of all the target wind energy installation to be optimized is initialized and selected (step 101). The wind energy installation to be optimized is assumed to be the installation No. 2. In a next step, the operating parameters of the target wind energy installation B(2) to be optimized as well as the values in the evaluation matrix E are checked (step 102). A suitable reference installation can then be defined on the basis of these values. This decision on the reference wind energy installation can be made manually, although it is expediently done automatically by means of determination element 52. The wind energy installations 1, 3 and 4 may be chosen here. It is assumed that the intrinsic conditions for all of the wind energy installations match, in particular in terms of the installation size and the control concept. This results in fundamental suitability as a reference wind energy installation. A check is also carried out to determine what match there is in the extrinsic conditions. This includes determining whether the reference wind energy installation under consideration is upstream or downstream of an obstruction in terms of the prevailing wind direction at that time. If this is the case, the relevant wind energy installation is unsuitable for use as a reference wind energy installation. As can be seen directly from the illustration in FIG. 2, the wind energy installations 1 and 3 are equivalent in terms of their installation location. Both are arranged alongside the target wind energy installation 2 to be optimized and are supposedly subject to the same wind conditions, even if they are not—apart from the local turbulence—entirely identical. The situation for the wind energy installation 4 is different. This is arranged immediately behind the target wind energy installation 2, that is to say it is located in its wake. In this case, it must be expected that the operation of the target wind energy installation will affect the wind energy installation 4. This is therefore not suitable for use as a reference wind energy installation. The match in terms of the further parameters, in particular relating to the wind strength and direction, is assessed for both of the wind energy installations 1, 3 which are still under consideration. Details relating to implementation will be explained later with reference to FIG. 4. A ranking value is formed from the degree of match between the intrinsic and extrinsic conditions. This is done successively for the reference wind energy installations under consideration. The installation with the best ranking value is finally defined as the reference wind energy installation (step 103). In the example, the installation No. 1 is thus assumed to be the reference wind energy installation.

The actual optimization process is then carried out by means of the optimization element 53 in the next step 104. This will be explained in more detail later. Once the optimization process for the target wind energy installation 2 has been completed, the process continues with the next wind energy installation (steps 105 and 106) until, finally, all of the wind energy installations in a park have been optimized (step 106). The park optimization process is thus complete.

Furthermore, FIG. 2 illustrates a variant by means of dashed lines, in which the wind is blowing from the direction illustrated by the dashed arrows. In this case, the wind energy installations 1 to 3 are now arranged in a row in the wind direction. As before, the aim is, by way of example, to optimize the wind energy installation 2. The same measures as those in the abovementioned example apply to the definition of the reference wind energy installation. However, the result is different because the wind direction has changed. Because of the different wind direction, the wind energy installations 1 and 3 are now upstream and downstream respectively of the target wind energy installation 2 to be optimized. They therefore cannot be used as a reference wind energy installation. However, because of these different wind conditions and in contrast to the situation described above, the wind energy installation 4 is now the favorite for the reference wind energy installation. This is true in any case with respect to the wind conditions. Whether it can actually be used as the reference wind energy installation also depends on the abovementioned static and/or intrinsic factors, in particular the machine type, the machine size, control concept, etc. If these intrinsic conditions preclude the choice of the wind energy installation 4 as the reference wind energy installation, then no suitable reference wind energy installation is available for the optimization of the wind energy installation 2. In addition, it is necessary to check whether the free incident flow on the wind energy installation No. 4 will not lead to corruption in comparison to the wake incident flow on the target wind energy installation 2. In a poor situation, the method according to the invention cannot be carried out for this wind direction.

Figure 9:
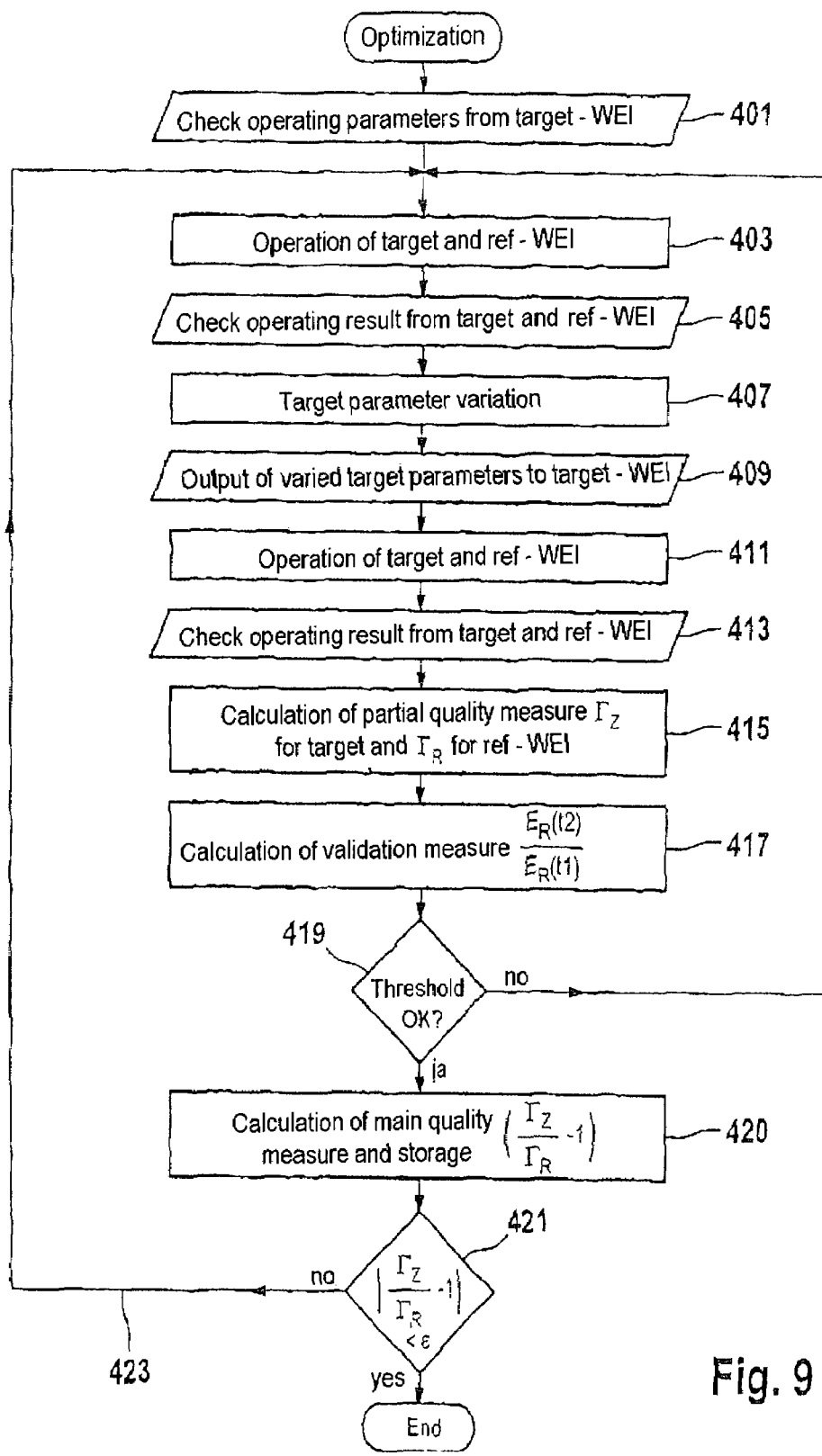
FIG. 9 shows an optimization step in the optimization process illustrated in FIG. 8.

Reference will now be made to FIG. 9 in order to explain the optimization step 104. First of all, a set of operating parameters is read in from the target wind energy installation 2 (step 401). After a predetermined measurement time period, for example of 10 minutes, has elapsed, the operating results $E_Z(t1)$ achieved with the first set of operating parameters for the target wind energy installation 2 as well as the operating results $E_R(t1)$ for the reference wind energy installation 1 are checked, and temporarily stored (step 405). While the target wind energy installation is running (step 403), with this (first) set of operating parameters, a second, different set of operating parameters is produced (step 407) by variation of one or more of the parameters (target parameters) to be optimized. The second set of operating parameters with the varied target parameters is then emitted (step 409) to the target wind energy installation 2, which is operated using this second set (step 411). The measurement time periods are in each case 10 minutes. Once a second measurement time period has elapsed, the operating results $E_Z(t2)$ which have been achieved using the second set are checked and, furthermore, the operating results $E_R(t2)$ achieved by the reference wind energy installation in this time period are checked (step 413). These operating results in the second measurement time period are likewise temporarily stored. A first partial quality measure is now formed for the desired target variable from the operating results of the target wind energy installation 2 (step 415) by 10-minute mean values (these are generally formed in any case by the controller 17 and are therefore available without any additional effort) of the two operating results $E_Z(t1)$, $E_Z(t2)$ being related to one another by forming their quotient. The validation element 54 carries out a corresponding procedure using the reference results of the reference wind energy; a second partial quality measure is formed from this as a validation measure (step 417). Fluctuations in the wind during the two measurement time periods, which could lead to corruption of the quality measure are identified by the validation measure. This results in the quality measure having removed from it influences which are not caused by the parameter discrepancies but by stochastic influences, in particular of the wind.

If the validation measure has a very high or low value outside the variable validation thresholds, then the fluctuation resulting from the wind during the two measurement time periods was too great to still allow comparability. The result is then rejected and the process repeated. This check follows in an optional step 419.

If the validation result is positive, a quality measure is formed from the partial quality measure. In the simplest case, this may be formation of the quotient of the partial quality measure for operation with the first parameter set and with the second parameter set (step 420). This makes it possible to determine whether the variation of the operating parameter in the target wind energy installation 2 has resulted in an improvement or deterioration. Depending on whether the relevant operating parameter is retained or further changed, the result may be stored for the next optimization step. Optimization processes that are known per se can be used for this purpose. The process is repeated (backward jump 423), until a termination criterion is reached (step 421). By way of example, the termination criterion is a specific threshold value ε and/or a number of repetitions being reached.

By way of example, a change in the "energy yield" quality measure of less than 0.1% after more than ten evaluated 10-minute measurement intervals may be used as a threshold value.

A check of the limit values (for example, whether the power or the rotation speed has been within the permissible range and/or whether the optimum tip-speed ratio has been maintained) can optionally be provided in steps 405 and 413, with the respectively achieved results being rejected and the step of operation of the wind energy installations and of checking being repeated if they are exceeded. A jump back to steps 403 and 411 can be provided for this purpose.

The target variable to be optimized is in this case the resultant electrical energy yield. In this case, the quality measure can be formed particularly easily and with little effort in step 415. For example, this can be done by integrating the electrical power produced by the wind energy installations to obtain the electrical energy output. If required, this may be carried out by means of a separate device (kilowatt power meter). It may be possible to do this by means of existing facilities in the wind energy installation. However, it is also possible to optimize other target variables, for example the noise emission, the grid-system compatibility of the electrical power that is produced, the machine load or the oscillation behavior. In this case, more complex quality measures can also be used, which take account of a plurality of parameters, for example, additionally the noise emission or machine load as well.

The measurement time periods for operation with the operating parameters may be preset differently, for example, 10 minutes for the blade angle or torque characteristic, a few minutes—10 minutes for control parameters, a few seconds to minutes for converter parameters, which, for example influence the grid-system compatibility. The time and number of measurement time periods are thus chosen so as to achieve adequate confidence in the measurement results. The more complex the constraints (for example hilly terrain, irregular installation distribution, very turbulent wind), the longer the measurement time period must be in order to allow the effect of parameter variation to be assessed.

A numerical example of the variation of the blade angle as the varied operating parameter will be explained in the following text. The target variable to be optimized is the power output, with the quality measure being governed by the energy yield.

The example is a variation of the blade angle in the partial-load range by 1.0 degrees, with a wind which becomes weaker on a random basis:

Measurement time period 1, blade angle target wind energy installation 0.3 degrees:

$E_Z(t1)=43$ kWh $E_R(t1)=51$ kWh

Measurement time period 2, blade angle target wind energy installation 1.3 degrees:

$E_Z(t2)=38$ kWh $E_R(t2)=44$ kWh

Partial quality measure:

$$\Gamma_Z = \frac{38}{43} = 0.884 \quad \Gamma_R = \frac{44}{51} = 0.863$$

The validation measure is formed from $$\frac{E_R(t2)}{E_R(t1)} = 0.863.$$

Validation threshold: max. 30% discrepancy, that is to say:

0.7<validation measure<1.3 ⇒ O.K.

Formation of main quality measure Γ by quotient formation:

$$\Gamma = \left(\frac{\Gamma_Z}{\Gamma_R} - 1\right) = 0.024.$$

Positive results mean an improvement in quality, and negative results mean a deterioration. This means that the yield, with the wind influence in the second measurement time period having been removed from it by variation of the blade angle, is improved by 2.4%.

With completely identical installations, the simple calculation method as explained above can also be carried out for other physical variables, for example, operating loads. The partial quality measures can be formed as quotients of damage-equivalent loads (DEL) which, as is sufficiently well known from the prior art, can be determined from measured load series over time using the on-line rainflow count method. However, if the installations are different, it may be worthwhile working only with multidimensional quality measures. A further example will be explained on the basis of the above-mentioned example, in which the aim is not only to improve the yield one-dimensionally but to form a multidimensional quality measure, in the example two-dimensionally, by additional consideration of the machine load (DEL=damage equivalent load). Particularly if the target wind energy installation and the reference wind energy installation are of different types, it is worthwhile taking account of the DEL in an intermediate step in order that the load on the wind energy installation can be taken appropriately into account in the formation of the quality measure. The machine load on the target wind energy installation during the two measurement time periods $DEL_Z(t1)$ and $DEL_Z(t2)$ is additionally required as a parameter for this purpose. Apart from this, the parameters from the previous example are used.

Yield improvement from which random fluctuations have been removed $$\Delta E = \frac{E_Z(t2)}{E_R(t2)} \cdot \frac{E_R(t1)}{E_Z(t1)}, \text{ for example 2.4\% (see above)}$$

relative load change $$\Delta L = \frac{DEL_Z(t2) - DEL_Z(t1)}{DEL_Z(t1)}, \text{ for example 1.3\%.}$$

A multidimensional quality measure is formed from this:

$\Gamma = f(\Delta L, \Delta E)$.

In this case, $f$ is an installation-specific and location-specific function for linking the load increase to the yield improvement.

To put it simply, the main quality measure must be assessed to determined whether, in the example quoted above, a yield improvement of 2.4% with a simultaneous increase in the installation load of 1.3% represents an overall improvement, or whether the load increase is sufficiently damaging to make it better to dispense with the additional yield.

Figure 6:
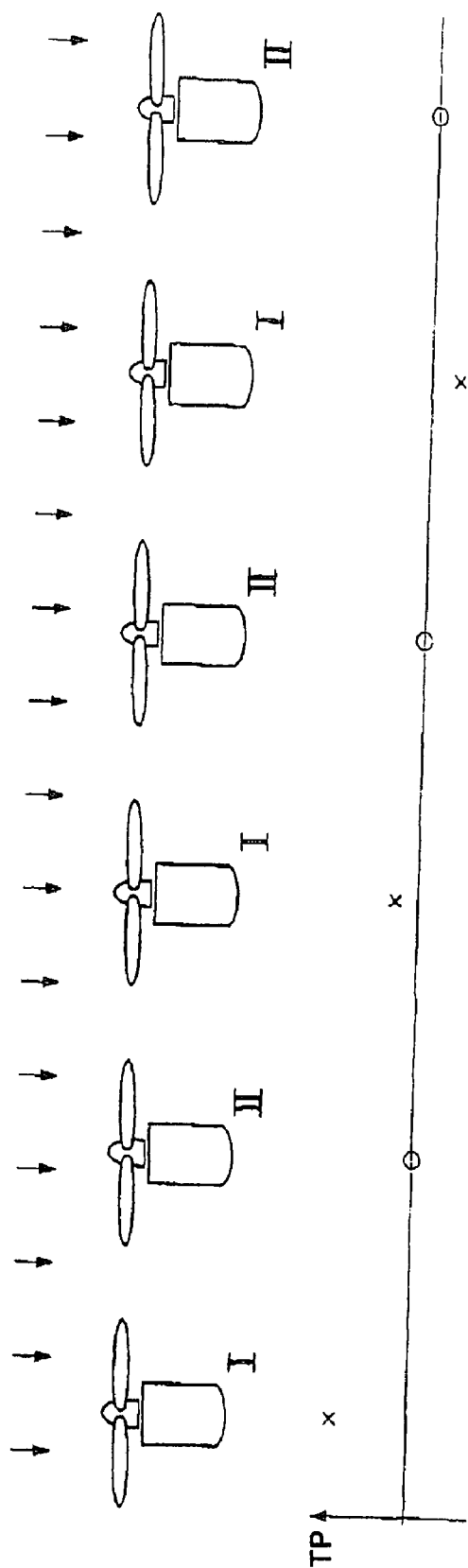
FIG. 6 shows a further exemplary embodiment of a windpark with groups of wind energy installations.

FIG. 6 shows a further exemplary embodiment. In this case, six wind energy installations are installed in a row in a windpark. It is assumed that the wind is blowing essentially transversely across the row. In order to carry out the optimization process according to the invention more quickly, assuming comparable machine types, etc., it can be applied to a plurality of target wind energy installations at the same time (Group I). The other wind energy installations in the row are defined as reference wind energy installations. These form Group II. The operation of all of the wind energy installations is now monitored and recorded during the course of the optimization process according to the invention. This has the advantage that, because of the large number of wind energy installations being recorded, even quite a short period of operation will frequently be sufficient to allow the effect of variations of the operating parameters to be assessed. Instead of a plurality of 10-minute mean values, it is frequently sufficient to record only one such 10-minute mean value. The determination of random fluctuations which is otherwise carried out over time is in this case carried out by the recording of a relatively large number of wind energy installations. Even a windpark with a relatively large number of wind energy installations can thus also be quickly subjected to the optimization process according to the invention.

As can also be seen from FIG. 6, the target wind energy installations of the group I are operated with different values for the target parameters to be optimized. These are symbolized by crosses on the coordinate. For a target parameter TP the respective value selected in one of the target wind energy installations is represented by a cross. Starting from the left, the target wind energy installations are operated with a greatly increased, a partially increased and a reduced value of this target variable. The value with which the reference wind energy installation is operated is represented by a circle. The optimization process according to the invention can now be used to quickly assess whether the original value, as used by the reference wind energy installation, is optimum, or in which direction and by what amount the search for an optimum value must be continued. Once the optimum value has been found, then the method according to the invention can be applied to another operating parameter and so on.

The inclusion of a plurality of reference wind energy installations in a group (Group II) also has the advantage that the reference wind energy installations can be matched to one another. This makes it possible to determine and, if appropriate, eliminate spurious values, so that the quality of the referencing process is also maintained in situations such as these. This is particularly important in those situations in which, during successive optimization processes such as those in a windpark, one reference wind energy installation has been optimized in advance as the target wind energy installation, with parameters having been changed. In poor situations, it is possible for the installation to "have been displaced", so that it is no longer suitable for use as a reference wind energy installation. This can be identified by a group formation such as this.

Figure 7:
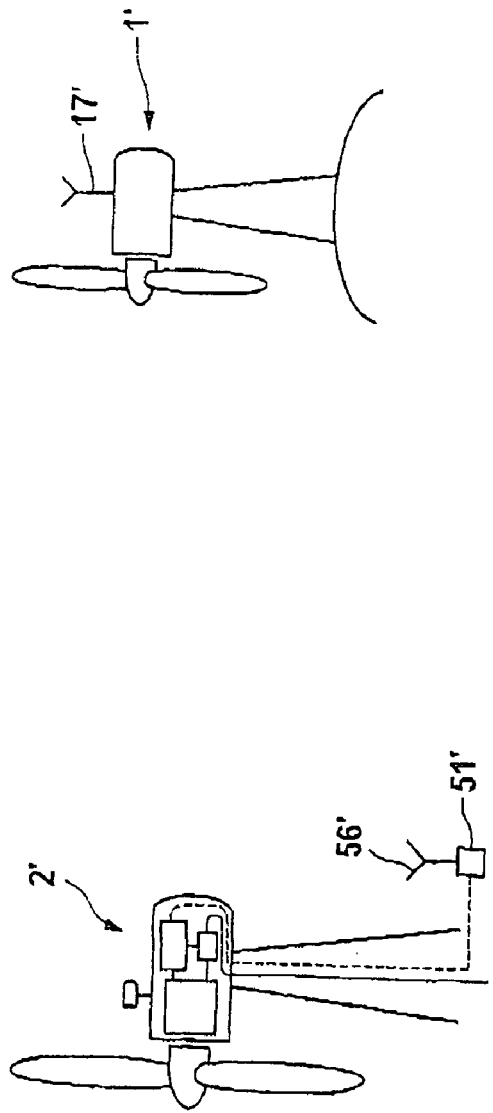
FIG. 7 shows a further exemplary embodiment relating to the use of the optimization process according to the invention for individual wind energy installations.

FIG. 7 shows an exemplary embodiment in which a single wind energy installation 2' is to be optimized, which is not a component of a windpark. In order to allow the method according to the invention to be carried out, a reference wind energy installation 1' is required. This does not need to be connected to the target wind energy installation 2' to be optimized in order to form a windpark and it is sufficient for it to be arranged in the physical vicinity. The better the match in the intrinsic and extrinsic conditions, the more suitable this is as a reference wind energy installation 1'. It may be sufficient if only a read access exists to time-synchronized operating results and/or operating parameters of the reference wind energy installation 1'. These are transmitted by means of a suitable transmission device to the target wind energy installation 2', which can then carry out the optimization process autonomously as well. There is no need for active access to the reference wind energy installation 1' for the optimization process according to the invention. The transmission device, may, for example, be in the form of a radio link with antennas 17' and 56'. This makes it possible to use a pilot installation at a selected location as a reference wind energy installation for a plurality of surrounding (individually operated) wind energy installations. The greater the physical distance, the longer the measurement time periods which are required in order to exclude stochastic wind fluctuations.

Figure 3:
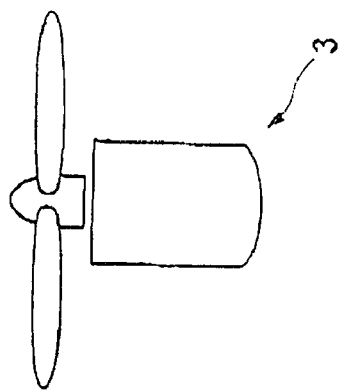
FIG. 3 shows a further exemplary embodiment of a windpark with a flow obstruction in the vicinity.
Figure 3:
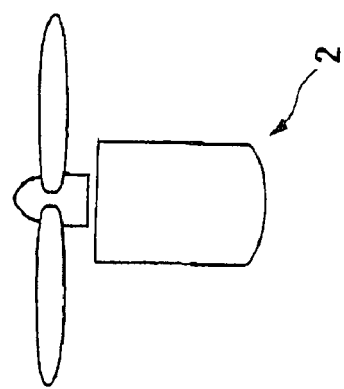
Figure 3:
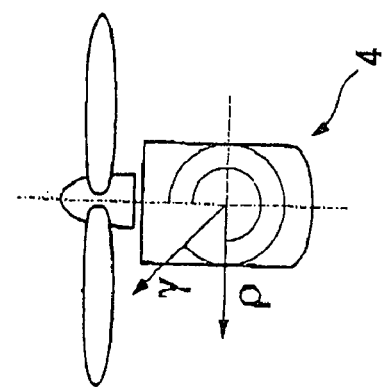
Figure 3:
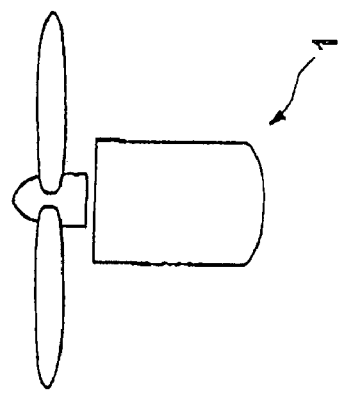
Figure 3:
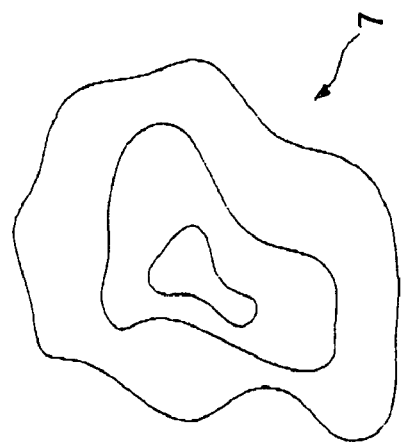
Figure 4:
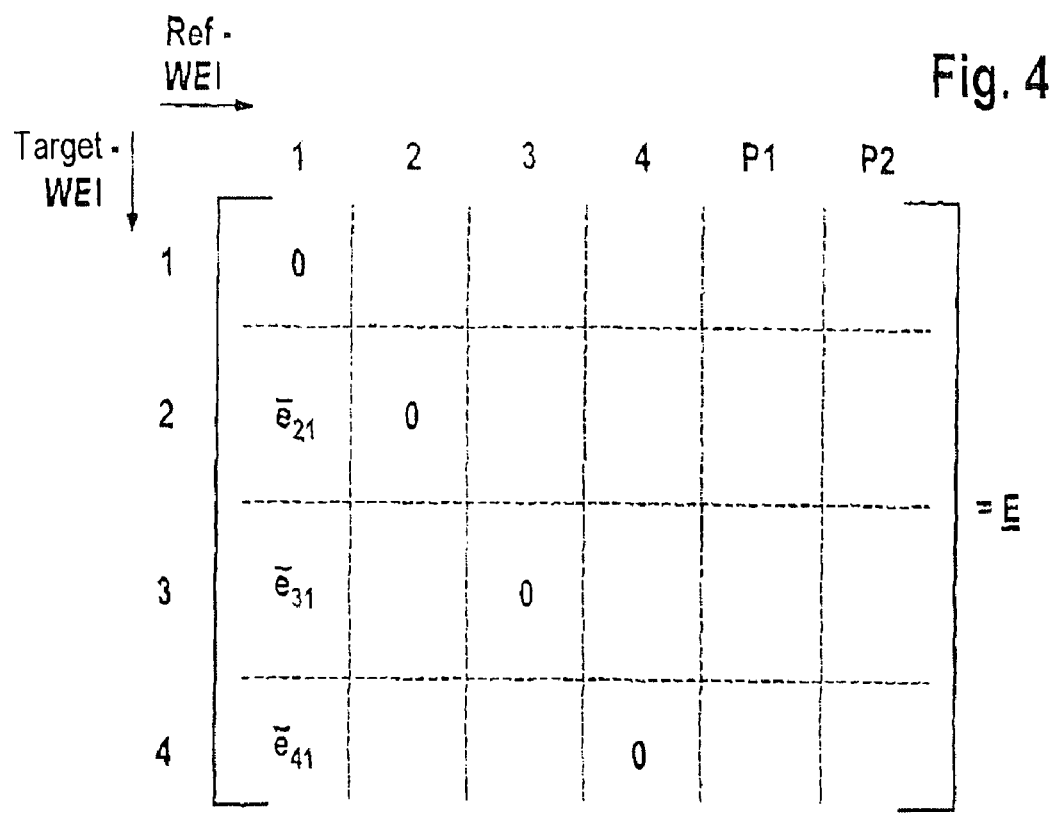
FIG. 4 shows an evaluation matrix for the windpark illustrated in FIG. 3.

The evaluation matrix E is illustrated in FIG. 4. Entries for the wind energy installations 1 to 4 to be optimized are provided in the rows. The wind energy installations which may be used as a reference wind energy installation are plotted in the columns. In the illustrated exemplary embodiment, these are the installations 1 to 4, as shown in FIG. 3, as well as two further wind energy installations P1 and P2. These are not a component of the windpark to be optimized (and are therefore not shown), but are separately operated wind energy installations to which only passive access exists for reading of parameters and operating results. The diagonal across the evaluation matrix has zero values. This means that an installation cannot intrinsically be used as a reference wind energy installation. Vectors are shown in the other cells of the matrix. The vector comprises vector values for intrinsic and extrinsic conditions. In the simplest case, the evaluation matrix contains a reference quality (for example 0-100 points) for various wind direction sectors (for example 10 degree sectors). The reference quality may be estimated by experienced specialists. In the case of automation, the reference quality is calculated on the basis of a multiplicity of parameters by the controller. Some of the most important influencing factors are: intrinsic: rotor diameter, hub height, installation power, control concept, installation variant, installation age, etc.; extrinsic: position of the installations with respect to one another, position and influence of orographic obstructions, details relating to the local incident-flow conditions (wind speed, wind direction, wind gradient, turbulence intensity, . . . ) etc.

Figure 5:
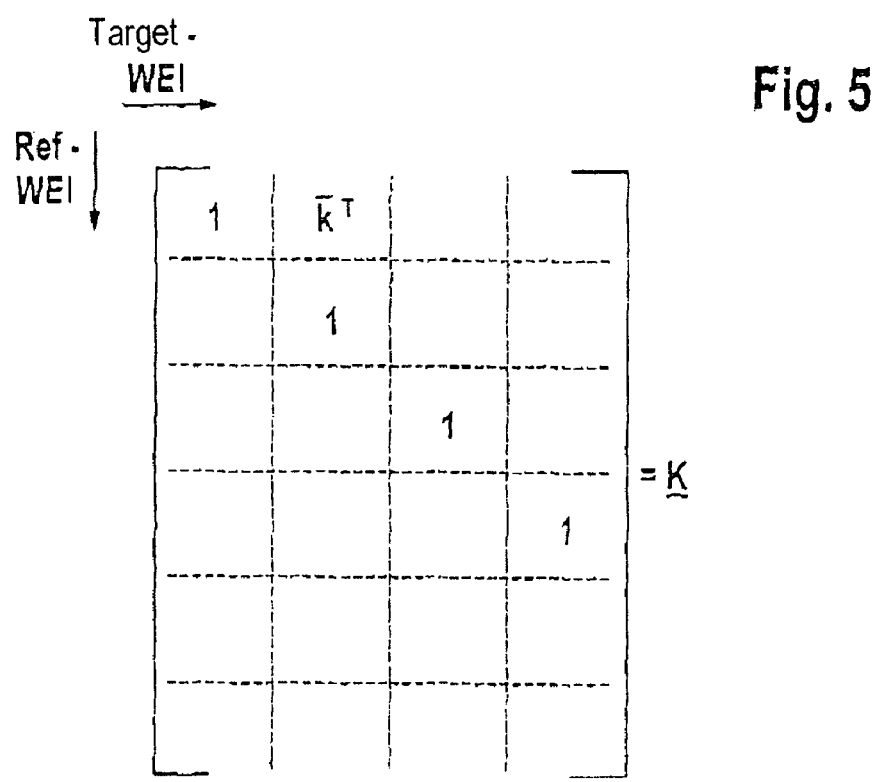
FIG. 5 shows a correction matrix for the evaluation matrix shown in FIG. 4.

A correction matrix K is laid out in a similar manner but in this case with the reference wind energy installations being arranged in the rows and the target wind energy installations in the columns. One example is illustrated in FIG. 5. The correction matrix in the simplest case has correction factors for various wind direction sectors. The correction value which can be associated with each reference quality takes into account, for example, empirical experience about the reference quality from previous optimization processes which have been determined, for example, by comparison with other reference installations. Spurious values mentioned above in groups of reference installations would, for example, be occupied by a correction value which would greatly reduce the reference quality.

The invention claimed is:

1. A method for optimization of the operation of one or more target wind energy installations, each of which comprises a rotor, a generator driven by the rotor to produce electrical energy, and a controller operating the target wind energy installation on the basis of a set of operating parameters, with one or more reference wind energy installations, the method comprising:

operating the one or more target wind energy installations to be optimized with a first measurement operation using a first set of operating parameters and a second measurement operation using a second set of operating parameters different from the first operating parameters, recording target variables for the one or more target wind energy installations resulting from the first measurement operation and the second measurement operation, and recording reference results of the one or more reference wind energy installations resulting from operation of the one or more reference wind energy installations, performing an automated evaluation of the target variables by calculation of a quality measure based at least in part on the reference results, and determining in an automated manner based on the automated evaluation which one of the first and second sets of operating parameters has a better quality measure.

2. The method of claim 1, wherein output power is used for the target variables and electrical energy yield is used for the quality measure.

3. The method of claim 1 or 2, further comprising varying a set of operating parameters to produce the first and second sets of operating parameters.

4. The method of claim 3, wherein the varied set of operating parameters include operating parameters for blade angle, rotation-speed torque characteristic or an offset of a wind direction sensor.

5. The method of claim 1 or 2, in which operating parameters of the one or more reference wind energy installations are not varied during the operation of the one or more reference wind energy installations on which the recorded reference results are based.

6. The method of claim 1 or 2, further comprising checking an evaluation matrix for validation of the one or more reference wind energy installations, the evaluation matrix comprising elements for various combinations of the target and reference wind energy installations.

7. The method as claimed in claim 6, wherein the evaluation matrix has vectors as elements.

8. The method of claim 7, comprising providing a correction matrix for the evaluation matrix.

9. The method of claim 6, comprising providing a correction matrix for the evaluation matrix.

10. The method of claim 9, further comprising carrying out a self-learning method in order to determine the correction matrix.

11. The method of claim 6, comprising automatically defining the one or more reference wind energy installations by using the evaluation matrix.

12. The method of claim 11, using static and dynamic conditions for the automatic defining of the one or more reference wind energy installations.

13. The method of claim 12, comprising using intrinsic conditions for the automatic defining of the one or more reference wind energy installations.

14. The method of claim 11, comprising using intrinsic conditions for the automatic defining of the one or more reference wind energy installations.

15. The method of claim 11, comprising using extrinsic conditions for the automatic defining of the one or more reference wind energy installations.

16. The method of claim 1 or 2, further comprising using a plurality of groups of wind energy installations as the one or more target wind energy installations or the one or more reference wind energy installations.

17. The method of claim 16, further comprising comparing values associated with an operation of wind energy installations in one group, detecting a discrepancy in the values between the wind energy installations in the one group, and eliminating the detected discrepancy in the group.

18. The method of claim 16, comprising varying sets of operating parameters for target wind energy installations in a group to produce a gradient field with respect to an operating parameter to be optimized.

19. A target wind energy installation comprising:

a rotor, a generator driven by the rotor to produce electrical energy, a controller configured to operate the target wind energy installation on the basis of a set of operating parameters, the controller being further connected to a reference wind energy installation, and an optimization module configured to operate the target wind energy installation which is to be optimized with a first measurement operation using a first set of operating parameters and with a second measurement operation using a second set of operating parameters different from the first operating parameters, record target variables for the target wind energy installation resulting from the first measurement operation and the second measurement operation, and recording reference results of the reference wind energy installation resulting from operation of the reference wind energy installation, perform an automated evaluation of the target variables by calculation of a quality measure based at least in part on the reference results, and determine in an automated manner based on the automated evaluation which one of the first and second sets of operating parameters has a better quality measure.

20. A windpark comprising a plurality of the target wind energy installations of claim 19.

* * * * *